Nov. 4, 1941.  H. J. SCHLESINGER  2,261,505
TELESCOPING TUBE LOCK
Filed June 26, 1940
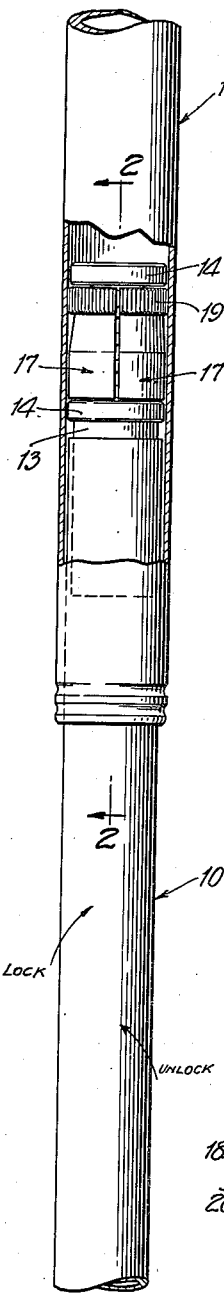
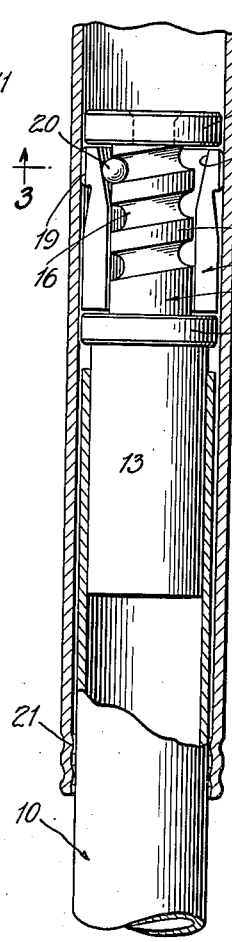
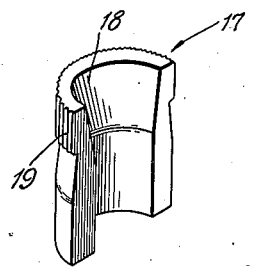
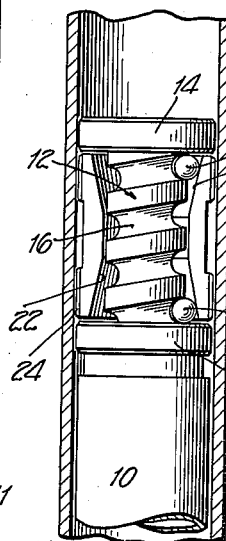
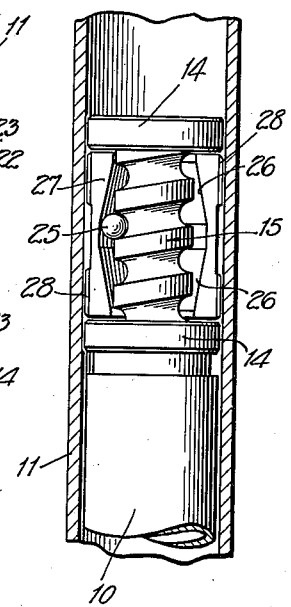
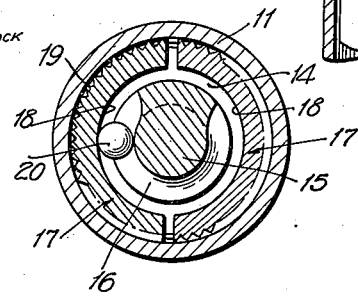
HYMAN J. SCHLESINGER.
INVENTOR.
BY
ATTORNEYS.

Patented Nov. 4, 1941

2,261,505

UNITED STATES PATENT OFFICE 2,261,505

TELESCOPING TUBE LOCK

Hyman J. Schlesinger, New York, N. Y.

Application June 26, 1940, Serial No. 342,501

4 Claims. (Cl. 287—58)

This invention relates to improvements in releasable telescoping tube locks for use in conjunction with tubular adjustable tripod legs, table legs, or other articles wherein two tubular sections are adapted to be locked in an adjusted position lengthwise relative to each other.

One of the important features of the invention resides in the simplicity of construction and ease of operation which permits the rigid locking of two tube members together and the unlocking of the same to effect free sliding of the tube members relative to each other.

Another feature of the invention is to provide a releasable telescoping tube lock which is carried by the inner telescoping tube member and which includes normally free clamping jaws adapted to be expanded into locking engagement with the inner walls of the outer telescoping tube member by action of a novel wedge means controlled by the turning of the inner telescoping tube member relative to the outer telescoping tube member, and which turning of the tube members relative to each other also controls the release of the jaws from locking position to unlocking position.

A further feature of the invention is the provision of a telescoping tube lock which is simple of construction and assembly, inexpensive of manufacture and which is entirely concealed within the telescoping tube members.

Other features of the invention will become apparent as the following specification is read in conjunction with the accompanying drawing, in which:

Figure 1 is a side elevational view of two telescoping tube members with parts broken away in section to illustrate my improved releasable lock.

Figure 2 is an enlarged vertical longitudinal sectional view on the line 2—2 of Figure 1.

Figure 3 is an enlarged horizontal sectional view on the line 3—3 of Figure 2.

Figure 4 is a detail perspective view of one of the jaw members.

Figure 5 is a vertical longitudinal sectional view of a modified form of the invention.

Figure 6 is a vertical longitudinal sectional view of a further modified form.

Referring to the drawing by reference characters, the numerals 10 and 11 designate a pair of telescoping tube members which are round in cross section, the member 10 being the inner telescoping member and the member 11 being the outer telescoping member. The inner telescoping ends of the tube members are freely slidable and rotatable relative to each other but they may be locked against sliding movement by means of a novel lock now to be described.

Fixedly secured to the inner end of the inner telescoping end of the tube section 10 is a screw element 12 which includes a cylindrical shank 13 having tight frictional fit within the inner walls of the tube member 10. Formed integral with the shank 13 and disposed beyond the inner end of the tube member 10 is a pair of spaced annular guide flanges 14—14, and connecting the flanges is a reduced concentric screw portion 15 having a relatively deep helical groove 16. The pitch of the screw portion is shown as a right pitch, although it may be of an opposite or left pitch if desired. Interposed between the flanges 14—14 and cooperatively surrounding the screw portion 15 is a pair of jaw members 17—17. Each jaw member 17 is semi-circular in cross section and is provided with an outwardly beveled wedge portion 18 on the inner wall and adjacent the outer end thereof. The exterior of the jaw member at its outer end is provided with serrations 19. The external diameter of the jaw members combined when in abutting engagement is less than the internal diameter of the tube member 11, and which position may be termed the contracted position of the jaws, which will enable the free sliding of the tube members 10 and 11 relative to each other. However, to effect an expansion of the jaw members into locking engagement with the inner walls of the tube member 11, I provide a metal ball 20 which is seated in the helical groove 16 and rides against the bevel wedge portions 18.

In practice, assume that the jaw members 17 are in retracted position, at which time the ball 20 is adjacent the outer end of the helical groove 16 and adjacent the outer end of the bevel portions 18. When the ball is in this position, the telescoping tube members 10 and 11 are free to be slid relative to each other to an adjusted position as to length. When the proper adjustment has been obtained, the tube section 10 is turned to the right relative to the tube section 11 as indicated by the arrow in Figure 1. The turning of the tube section 10 causes the screw element 12 to likewise turn which causes the helical groove to move the metal ball inwardly over the bevel surfaces 18 until it becomes tightly wedged between the wedge surface 18 of one of the jaw members 17 and the walls of the groove, at which time the jaw member has been expanded to cause the serrated portion 19 thereof to bite against the inner walls of the tube member 11. The two tube sections 10 and 11 are now tightly locked together against sliding movement. To effect an unlocking of the telescoping tube members, the operator grasps the tube section 10 and imparts a left turning movement thereto as indicated by an arrow in Figure 1. The turning of the tube member 10 to the left causes the screw element 15 to feed the metal ball 20 outwardly, thus breaking the wedging action between the screw element and one of the jaw members 17. When the wedging action is broken, the jaw members 17—17 are free and the tube sections 10 and 11 may be freely slid relative to each other.

The annular flanges 14—14 act to assist in guiding the telescoping portions of the tube members and to confine the jaw members 17—17 against longitudinal shifting. The inner end of the tube section 11 is provided with an annular stop flange 21 with which the inner flange 14 engages to prevent the telescoping ends of the tube members from pulling apart.

In Figure 5 of the drawing, I have illustrated a modified form of my invention wherein the jaw members 17 are provided with inner outwardly beveled wedge surfaces 22 in addition to the wedge surfaces 18 and with which a metal ball 23 engages, the same being located adjacent the inner end of the helical groove 16. The lower exterior portion of the jaw members 17 are provided with serrations 24. By providing double wedge action at opposite ends of the screw 15, it is possible to lock the telescoping tube members by turning the tube member 10 in either direction. The tube members are released from a locking position by turning the tube section 10 in a direction opposite to that employed for effecting a locking of the same.

In Figure 6 of the drawing, a further modified form of the invention is illustrated wherein a single metal ball 25 wedgingly engages either of two spaced inwardly beveled wedge surfaces 26—26 provided on the inner surface of jaw members 27. The exterior jaw members 27—27 adjacent the ends thereof for gripping engagement with the inner walls of the tube section 11. The ball 25 is shown in a free neutral released position between the spaced wedge surfaces 26—26, and the turning the tube section 10 in either direction, will cause the ball 25 to be fed by the screw element 12 to wedging engagement with one of the beveled surfaces 26, thus effecting a locking of a jaw member with the interior walls of the tube member 11. To release the ball 25, the tube member 10 is turned in a direction opposite to that which effected the locking action, so that the ball will return to the space between the surfaces 26—26.

Telescoping tube members such as shown at 10 and 11 are employed for many uses, such as tripod legs, folding table legs, and the like, therefore I do not wish to limit myself to any particular use of the telescoping tube sections, for my invention resides in the releasably locking of the tube sections in various positions of longitudinal adjustment.

While I have shown and described what I consider to be the preferred embodiments of my invention, I wish it to be understood that such changes as come within the scope of the appended claims may be resorted to if desired.

Having thus described the invention, what I claim as new and desire to secure by Letters Patent of the United States, is:

1. In combination, inner and outer telescoping members rotatable relative to each other, a screw member fixedly mounted on and extending from the telescoping end of the inner telescoping member, spaced flanges on opposite ends of said screw member, jaw members freely encircling said screw member and being interposed between said flanges, bevel surfaces provided on the inner sides of said jaw members, and a metal ball interposed between the bevel surfaces of the jaw members and the spiral groove of the threads of said screw member, whereby turning movement of the inner telescoping member in one direction will cause said screw member to move said ball into wedging engagement with the bevel surfaces of the jaw members to expand the same into tight frictional engagement with the inner wall of the outer telescoping member to lock the telescoping member against sliding movement.

2. In combination, inner and outer cylindrical telescoping members, the inner telescoping member being rotatable relative to the outer telescoping member, a screw member fixedly mounted on and extending beyond the telescoping end of the inner telescoping member, said screw member having a helical groove portion, annular flanges at opposite ends of the groove, segmental jaw members grouped about the helical groove portion of the screw member and interposed between the annular flanges, bevel surfaces provided on the inner side of the jaw members, and a metal ball seated in the helical groove and movable over the bevel surfaces, whereby turning of the outer telescoping member in one direction will cause said ball to wedgingly engage the bevel surfaces of the jaw members and expand the same outwardly into tight frictional engagement with the inner walls of the outer telescoping member to prevent sliding movement of the telescoping members relative to each other, and subsequent turning of the inner telescoping member in an opposite direction will effect a release of the ball from wedging engagement with the bevel surfaces of the jaw members.

3. In combination, inner and outer cylindrical telescoping members, the inner telescoping member being rotatable relative to the outer telescoping member, a screw member fixedly mounted on and extending beyond the telescoping end of the inner telescoping member, said screw member having a helical groove portion, annular flanges at opposite ends of the groove, segmental jaw members grouped about the helical groove portion of the screw member and interposed between the annular flanges, beveled surfaces at opposite ends of the jaw members on the inner side thereof, and two metal balls disposed respectively at opposite ends of the helical groove and seated therein for movement over the respective bevel surfaces, whereby turning movement of the inner telescoping member in either direction will cause one of the balls to wedgingly engage its related bevel surface to expand a jaw member into tight frictional engagement with the inner walls of the outer telescoping member to lock the telescoping members against sliding movement.

4. In combination, inner and outer cylindrical telescoping members, the inner telescoping member being rotatable relative to the outer telescoping member, a screw member fixedly mounted on and extending beyond the telescoping end of the inner telescoping member, said screw member having a helical groove portion, annular flanges at opposite ends of the groove, segmental jaw members grouped about the helical groove portion of the screw member and interposed between the annular flanges, inwardly beveled surfaces provided at opposite ends of the jaw members, a metal ball seated in said helical groove and normally disposed in a neutral position intermediate the beveled surfaces, whereby turning movement of the inner telescoping member in either direction will cause said ball to wedgingly engage one of the beveled surfaces to expand a jaw member into tight frictional engagement with the inner walls of the outer telescoping member to lock the telescoping members against sliding movement.

HYMAN J. SCHLESINGER.